(No Model.) 4 Sheets—Sheet 1.

W. S. F. DILLON.
DYNAMO ELECTRIC MACHINE.

No. 498,969. Patented June 6, 1893.

Attest
L. M. Jones
Joseph C. Butler

Inventor
William S. F. Dillon
by John E. Jones
his attorneys (No Model.) 4 Sheets—Sheet 2.

W. S. F. DILLON.
DYNAMO ELECTRIC MACHINE.

No. 498,969. Patented June 6, 1893.

Attest
L. M. Jones
Joseph C. Butler

Inventor
William S. F. Dillon,
by John E. Jones,
his attorney.

(No Model.) 4 Sheets—Sheet 3.

W. S. F. DILLON.
DYNAMO ELECTRIC MACHINE.

No. 498,969. Patented June 6, 1893.

Attest
L. M. Jones
Joseph C. Butler

Inventor
William S. F. Dillon,
by John E. Jones,
his Attorney (No Model.) 4 Sheets—Sheet 4.
W. S. F. DILLON.
DYNAMO ELECTRIC MACHINE.

No. 498,969. Patented June 6, 1893.

Attest
L. M. Jones
Jno. C. Butler

Inventor
William S. F. Dillon,
by John E. Jones,
his Attorney

UNITED STATES PATENT OFFICE.

WILLIAM S. F. DILLON, OF CHICAGO, ILLINOIS.

DYNAMO-ELECTRIC MACHINE.

SPECIFICATION forming part of Letters Patent No. 498,969, dated June 6, 1893.

Application filed November 21, 1892. Serial No. 452,686. (No model.)

*To all whom it may concern:*

Be it known that I, WILLIAM S. F. DILLON, a subject of the Queen of Great Britain, residing at Chicago, in the county of Cook and State of Illinois, have invented certain new and useful Improvements in Dynamo-Electric Machines, of which the following is a specification.

My invention relates to a dynamo-electric machine, the arrangement, construction, and operation of which will be fully hereinafter described and particularly specified in the claims.

In the accompanying drawings Fig. 24 another modified form of sleeve, being shown in elevation and in two parts, with a cross-section of the brushes therein.

A represents an open, oblong, rectangular base-frame having lateral, centrally-orificed lugs $a$ for receiving the usual bolt or screw fastenings. Both of the inner longitudinal faces of the open base A, are shouldered at both top and bottom, to form the upper guide-way $a'$, and the lower guide-way $a^2$.

Figures 4, 6:
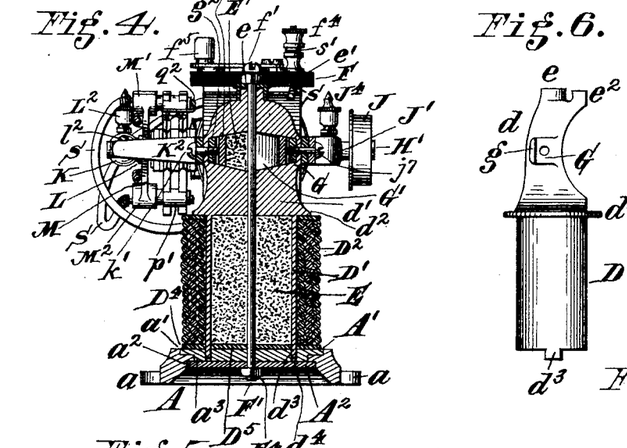
Fig. 4 a transverse, sectional elevation on line $x$, $x$, of Fig. 1, the chamber in the left-half of the pole-piece being shown filled or packed with small particles of soft iron or other similar magnetizable material, and the chamber in the right-half shown without said packing, for clearness.
Fig. 6 a side elevation of my preferred form of combined pole-piece and lower shell, the latter being provided for the external wire-coil and the internal-core of small particles of magnetizable-matter.
Figures 12, 13, 14, 15, 16, 17, 18, 19, 20, 22, 23:
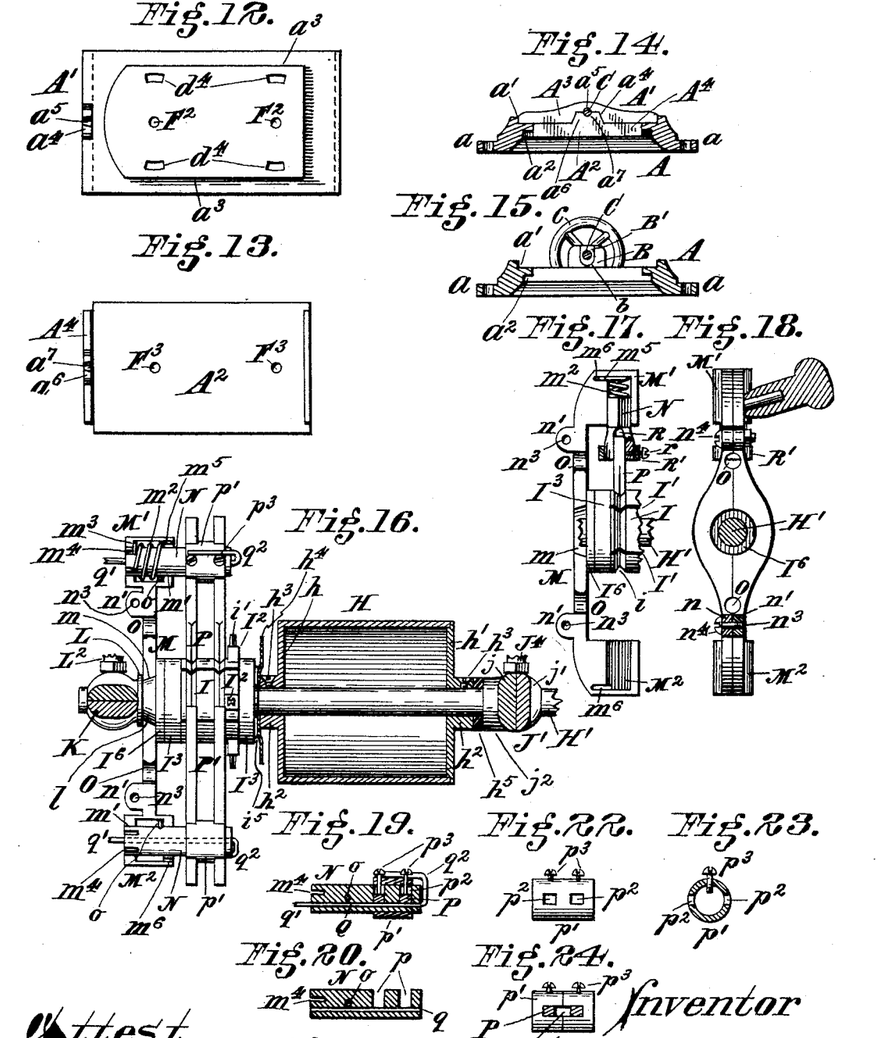
Fig. 12 a bottom-plan of the upper plate forming part of the double bottom or slide for supporting the dynamo.
Fig. 13 a top plan of the lower-plate of said double bottom or slide.
Fig. 14 a transverse section of the said double-bottom and its supporting frame or base, looking rearwardly, on the line $y$, $y$, Fig. 3, but omitting the dynamo.
Fig. 15 a transverse, sectional elevation on the same line $y$, $y$, of Fig. 3, but looking forwardly, to show the adjusting-devices for said sliding-bottom.
Fig. 16 a transverse, sectional elevation, showing the armature-shell, its shaft and bearings, said shaft being broken off at one end, the commutator and my preferred form of collector or brush device, the two-part or centrally split yoke or rocking-bar of the latter having one of its two divisions thereof removed so as to clearly present to view its full construction and that of its bearing.
Fig. 17 an elevation of one division of a modified form of my two-part or centrally-split rocking-bar or holder, and an accompanying collector or brush device, together with broken off portions of the commutator and shaft.
Fig. 18 a front elevation of the modified form of brush-holder shown in Fig. 17, but showing both sections thereof united, as they appear in use.
Fig. 19 a central, longitudinal section of the arm or spindle on which the brushes are mounted, and seen in Fig. 16.
Fig. 20 a detail, central, longitudinal section of the spindle seen in Fig. 19.
Fig. 22 a view similar to Fig. 21, but of a modified form of sleeve.
Fig. 23 a transverse section of the sleeve shown in Fig. 22, on a line with one of the binding or fastening-screws.
Figure 21:
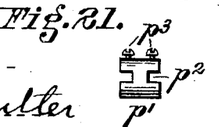
Fig. 21 a detail elevation of my preferred form of sleeve used on the spindle seen in Figs. 16 and 19.

$A'$ represents an upper plate or slab, and $A^2$ a lower one, together forming a movable double bottom or bed-plate for supporting the dynamo. Plate $A'$ has under-shoulders $a^3$ along both its longitudinal edges, which correspond to and engage the guide-ways or shoulders $a'$ of the base A, the lower plate $A^2$ being arranged flatly against the bottom of plate $A'$, and having its opposite longitudinal edges engaging the guide-ways or shoulders $a^2$ of the base, as best shown in Figs. 4 and 14.

$A^3$ represents a transverse, raised rib or flange at the fore-edge of plate $A'$, being highest at its center where it is hollowed out beneath to form a recess $a^4$.

$a^5$ is a central groove or notch in recess $a^4$, semi-circular in cross-section and tapered in length, with its broadest portion at its rear or inner end, as best seen in Figs. 2, 3, 12, and 14.

$A^4$ represents a transverse, raised rib or flange at the fore-edge of the lower plate $A^2$, its ends terminating so as to fit within the ribs formed by the shoulders $a'$ and $a^2$, along the inner edges of the base A. At the center of flange $A^4$ is constructed an upright projection or standard $a^6$, corresponding to and fitting within the recess $a^4$ in the upper plate $A'$, a central groove or notch $a^7$, which is a counterpart of said groove $a^5$ in recess $A^4$, being constructed in the upper face of said projection and coinciding with said groove $a^5$, to complete a taper-hole for the purpose I shall presently describe herein.

B represents a central, upright projection or standard constructed at the fore-end of the open-base A, and having an open slot or recess $b$, with internally concaved or grooved sides $b'$, $b'$, to accommodate a removable filling or nut $B'$, the sides of the latter being ribbed or formed to suit and fit within said grooves $b'$.

C represents a screw engaging a central, threaded-orifice in the nut $B'$, and having a manipulating wheel or handle $c$ at its rear-end, with a conical formation $c'$ at its fore-end, the latter corresponding to and engaging the tapered opening or holding-sockets formed by the two grooves $a^5$ and $a^7$, hereinbefore described, thus furnishing a suitable bearing for the inner end of said screw, which makes such connection with the double bed-plate or bottom $A'$, $A^2$, whereby the latter may be readily moved or adjusted in either direction longitudinally on its guide-ways, for the tightening or loosening of the running-belt of the dynamo, or other usual purposes desired.

Figure 2:
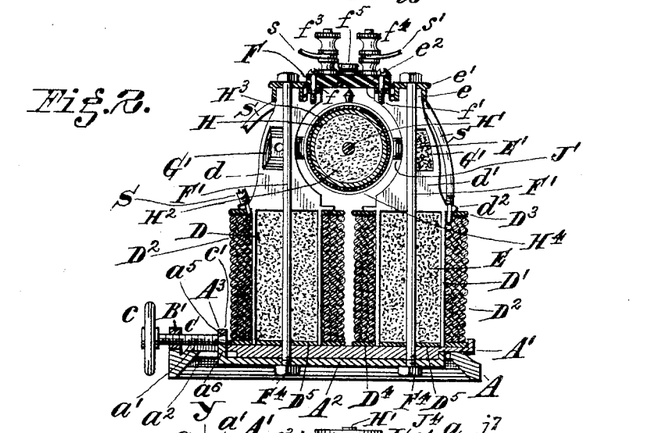
Fig. 2 a central longitudinal sectional elevation of the same.
Figure 3:
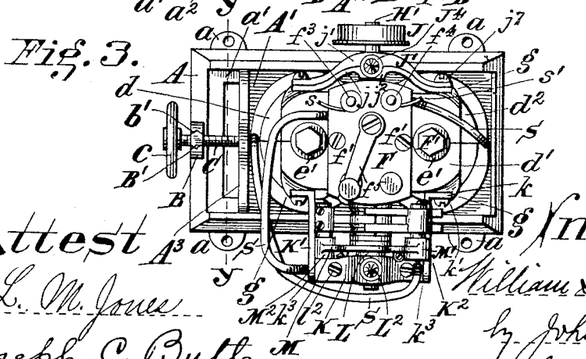
Fig. 3 a plan view of the same.

In my preferred form of dynamo, I have shown upright field-magnets, which form I shall first describe, viz: D, D', represent upright hollow shells or cells surmounted by the polar-extensions or pole-pieces $d$, $d'$, and intermediate horizontal flanges $d^2$, and provided with pendent projections or steps $d^3$, which latter are seated in slots or holes $d^4$ constructed at either side the center in the upper base-plate $A'$. These shells are filled with minute particles of magnetizable-material E, such as iron filings, turnings, or the like, which latter are compressed into a homogeneous-mass within the cavities of said shells and form the cores of the field magnet. The wire forming the field-magnet coils $D^2$, is suitably wrapped or wound around the shells D, D', and insulating-washers $D^3$ and $D^4$, are introduced at the top and bottom, respectively, of said coils, and plug-plates or covers $D^5$ at the bottom of the cores E. Shells D, D', are made elliptic in cross-section, and their steps $d^3$, when seated in place, prevent their turning and also facilitate the accurate and proper setting of the field-magnets on the base. At the upper end of each pole-piece is constructed a boss $e$ having a cap $e'$, and the inner faces of said pole-pieces are concaved concentric with the armature, as customary, and sufficient to provide the proper space within which the armature rotates. The inner, upper ends or horns $e^2$ of said pole-pieces are flattened, to accommodate the cover or cap-plate F, whose opposite side-edges rest thereon with an intermediate insulating strip or bar $f$. Cap-plate F forms the usual cover to protect the armature and is secured in place on said horns by means of screws $f'$, whose shanks pass downward through said strips $f$, into central threaded-openings $f^2$ in said horns, as best seen in Fig. 2. The cap-plate is made of fiber or other suitable insulating-material, and has mounted thereon the binding-posts $f^3$, $f^4$, and also a shunt or switch device $f^5$, the latter enabling the use of the machine as a motor, as customary.

G represents a pair of centrally-orificed ears or bosses on the cheeks of both the pole-pieces, immediately in rear of the armature-concavities; and $g$ represents lateral projections or flanges at the rear ends of said ears, the particular purpose of which will follow hereinafter. The field-magnet shells and the polar-extensions or pole-pieces are constructed in two corresponding halves, split down the center, (at right angles with the armature,) as most clearly shown in Figs. 2, 3, 4, 5, 7, 8, and 9, both divisions being counterparts of each other in every particular, and the pole-pieces of each formed with an angular cavity or chamber $G'$ and a central, vertical, semicircular groove $g'$. Pole-chambers $G'$ are each filled with minute-particles of magnetic-material $E'$, such as iron-filings, or the like, the same as cores E, of the shells D, a nut $g^2$ and a suitable lining or backing $g^3$, the latter to prevent said particles falling or escaping through the nut-hole, being first placed in the bottom of each chamber prior to introducing and compressing the said minute-particles.

$F'$, $F'$, represent two vertical bolts, each passed downwardly through central holes in caps $e'$, bosses $e$, holes formed by the coincidence or registering of grooves $g'$ in the pole-pieces, thence centrally through the cores E, plug-plates or stoppers $D^5$, and holes $F^2$ and $F^3$, in the upper and lower plates, respectively, of the double sliding-bottom.

$F^4$ represents nuts engaging the threaded lower ends of bolts $F'$, for securely fastening the field-magnets and accompanying parts in place on said sliding-bottom. Caps $e'$ rigidly hold the upper ends of the two-part pole-pieces together, and may be readily removed on the slight raising of the bolts $F'$ when the nuts $F^4$ have been first removed. The cores or fillings E are placed in the shells after first introducing the said bolts from above into the empty shells. A suitable rammer with a central hole fitting over the bolts, is then used to tightly compress said fillings in each shell, and finally the said stoppers or covers $D^5$ are placed on the bottom of the fillings E to prevent said fillings falling out or escaping, and to make good contacts on the base below. The compressed or rammed fillings or cores E and $E'$, in both magnets and pole-pieces, produce a strong magnetic-field, equal to solid wrought-iron, and capable of developing just as efficient lines of magnetic-force at much less expense, and very economical to maintain.

Figures 31, 32, 33, 34, 35, 36:
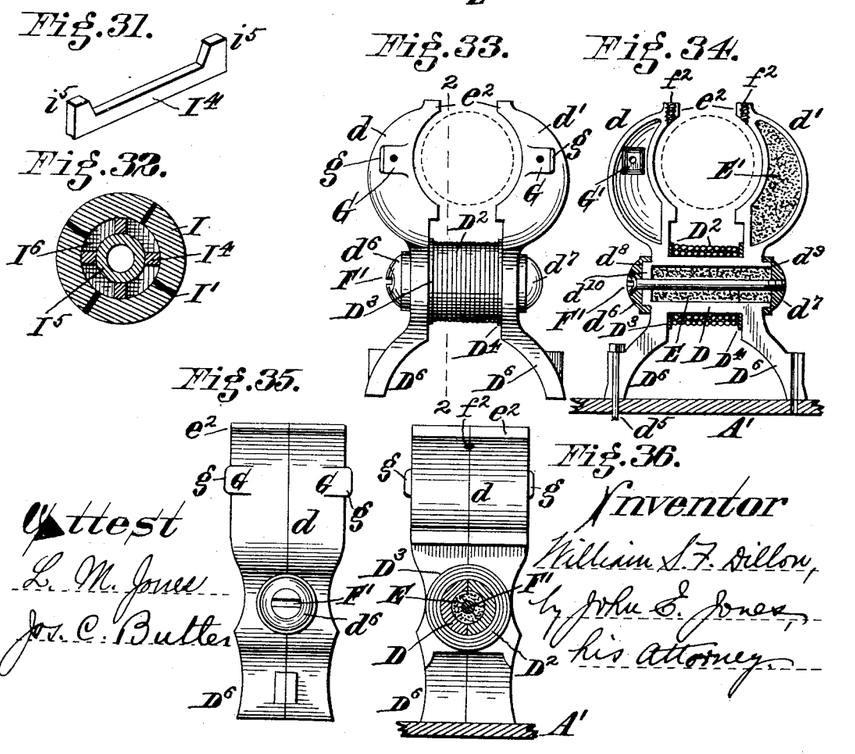
Fig. 31 a detail perspective view of one of the wedge bars or ribs of the commutator.
Fig. 32 a cross-section of the commutator on line 1, 1, Fig. 25, taken in the direction of the arrow.
Fig. 33 a longitudinal elevation of a modified form of field magnet and pole-pieces, the dotted circle within the latter representing the outline of the armature.
Fig. 34 a central, longitudinal, sectional elevation of Fig. 33, showing in addition thereto a broken off portion of a supporting base-plate and one fastening-bolt.
Fig. 35 an end view of Fig. 33.
Fig. 36 a transverse sectional elevation on line 2, 2, of Fig. 33 including the base-plate seen in Fig. 34.

In Figs. 33 to 36 inclusive, I have shown a modified form of field-magnet, which I shall now describe, viz: D is a horizontal, circular shell or cell surmounted at both ends by the polar-extensions or pole-pieces $d, d'$, and provided with suitable supporting-legs $D^6$, the latter being firmly secured in place, anywhere, or, if desired, on my form of base or bed-plate (the upper part $A'$, only, being shown in Figs. 34 and 36) by means of bolts $d^5$. Shell D is also filled with minute-particles of magnetizable-material which serve to form the core E, the same as in the preferred form before described, and caps $d^6$ and $d^7$, (similar to caps $e'$ aforesaid,) are provided, which fit over flanges or annular extensions $d^8$ and $d^9$, respectively, (similar to bosses $e$ aforesaid,) at either end of said shell, as best shown in Fig. 34. The wire forming the field-magnet coil $D^2$, is wound around the shell D, with suitable insulating-washers $D^3$ and $D^4$, respectively, at either end thereof. Pole-pieces $d, d'$, are concaved on their inner faces, and provided with horns $e^2$, screw-holes $f^2$, flanged ears G, $g$, and cavities or chambers $G'$, the same as those previously described in connection with my preferred form of field magnet, and for the same purposes, but the metal, above and below said chambers $G'$, and, in fact, both pole-pieces are constructed entirely hollow and filled with said minute-particles of magnetizable-material to form cores $E'$, as also best shown in Fig. 34. In this modified form, the horizontal field-magnet shell, upright pole-pieces and pendent supporting-legs are preferably constructed, as shown, in two corresponding halves, split longitudinally down the center, (at right angles with the armature,) a half of each pole-piece and leg being made integral with each end of each half of the said shell, as clearly shown in Fig. 34. When made split, as just stated, the two divisions of the field magnet are firmly united by a single horizontal-bolt $F'$, whose shank passes through the end-caps $d^6$ and $d^7$, the core E, and an end-wall $d^{10}$, the latter being preferably provided for both strength and a base or backing for the compacting operation in applying the minute particles comprising said core E. The head of the bolt $F'$ is a conical one, with a transverse slot, and is countersunk in the cap $d^6$, and the opposite, threaded end engages a central threaded-hole in the cap $d^7$, both caps being extra heavy in thickness for these purposes, and thereby dispensing with additional, unsightly nuts and bolt-heads extending therefrom.

Both forms of field magnet shown, being hollow and split ones, are preferably so made, and thereby constitute an important feature of my invention herein, for the following important reasons: that each half or division is cast alike, and forms a perfect counterpart of the other; that all the bolt and screw holes therein can be made without drilling; that all the hollow portions or chambers for the filling-material or cores E, $E'$, can be readily made without expensive coring or boring; that all the parts, thus divided, can be readily handled, fitted together or taken apart, and the interior easily opened up to full and clear view to suit the convenience of the workman or others, for inspection, repairs, injured members replaced by new ones in a short time and at a great saving in cost, and other objects, as desired. Both sections or halves of each field magnet being exactly alike, all corresponding openings and parts thereof must necessarily and readily match, and the coinciding semi-circular-grooves, which form the holes for screws, are properly screw-threaded, after both halves have been brought together.

It is obvious that, instead of the field-magnets being built up of small particles of magnetizable-material contained within a hollow chamber or shell, wound with wire, their cores could be made of solid soft-iron or other suitable magnetizable-material formed to fit within said shells, but at no such advantage in cost for the reason that said small particles are practically nothing but waste or scraps from operating tools in shops, and they need not be shaped to fit as said solid-cores must be.

Figures 5, 10:
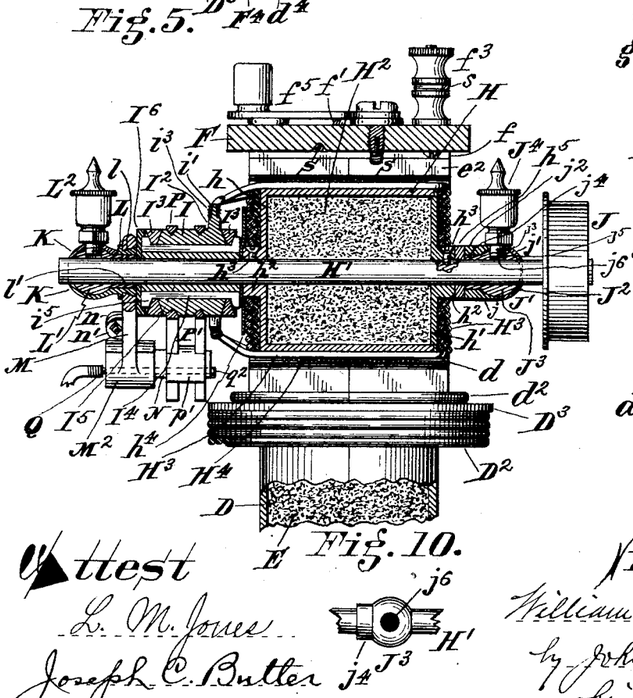
Fig. 5 a central, transverse sectional elevation, (on a larger scale,) showing the armature, its shaft and spherical-bearings, including my preferred form of mounting the oil-cups in said bearings, the commutator, the brush or collector devices, one of the pole-pieces at the upper end of a broken off field-magnet, and the surmounting bridge-piece supporting the switch and binding-posts.
Fig. 10 a broken off plan of the armature-shaft and one of my preferred spherical or ball bearings applied thereto.
Figures 7, 8:
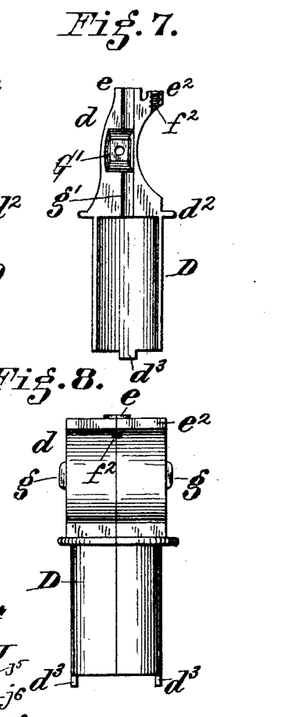
Fig. 7 an elevation of the inner face of one section or division of the split pole-piece and shell shown in Fig. 6.
Fig. 8 an elevation of the two-part or centrally split pole-piece and shell shown in Fig. 6, at right angles thereto, and that side thereof facing to the right.
Figure 9:
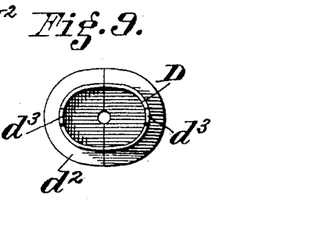
Fig. 9 a bottom-plan of Fig. 8.

The armature is of the drum-type and provided with a hollow shell or cylinder H having one end $h$ closed, and the other end $h'$, a removable one, the latter being made with its inner periphery shouldered to fit an internal shoulder or rabbet in the open end of said shell, as best shown in Figs. 5 and 16. Both ends $h$ and $h'$, are provided with central, outwardly-projecting bosses $h^2$, which receive set-screws $h^3$, the inner ends of the latter engaging the armature-shaft H', whereby said armature-drum is firmly but detachably secured to said shaft.

Figures 1, 11:
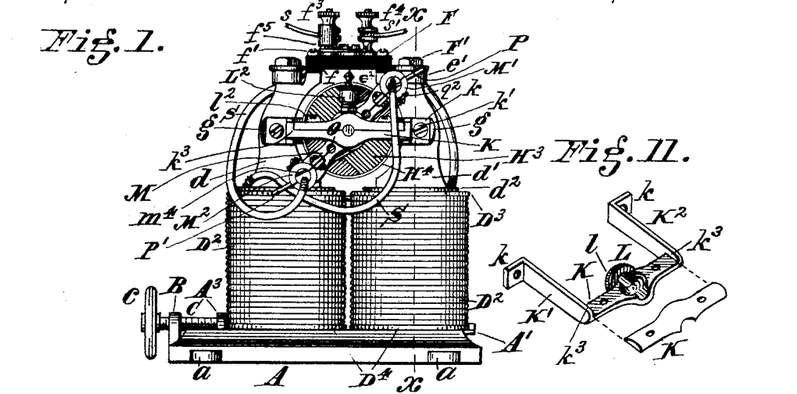
—Figure 1 is a longitudinal elevation of my invention in its preferred form, showing the side containing the commutator and brush collector and distributing devices.
Fig. 11 a detail perspective view of the preferred form of bearing used at the commutator and brush-holder end of the armature-shaft, the top-plate being removed to one side.

$H^2$ represents the armature-core proper, which is preferably composed of small particles of material of magnetic permeability, (the same as that contained in said field-magnets and pole-pieces,) properly pressed, rammed, or otherwise closely packed within the shell H through the open end thereof, and forming an exceedingly cheap and thoroughly efficient core whose magnetic-resistance is reduced to a minimum owing to the great quantity of said purely magnetizable-material which may be introduced into the drum H at trifling expense, and which is capable of urging more lines of force than any cores hitherto in use, as is clearly obvious. Instead of using said small particles of magnetizable-material for the armature-core proper, it is quite evident that solid wrought-iron, or solid soft-iron or other magnetizable-material could be used as a filling for the drum H, but the expense would be greater for both material and labor, and the result in efficiency no better to any appreciable extent. The armature is wound in coils $H^3$ in the ordinary manner of winding the drum-type of armatures, and circumferentially bound with wire-bands $H^4$, as is customary, all as clearly shown in Figs. 1, 2, and 5. A mica or other adequate insulation forming an end-piece or disk $h^4$, is provided at one end of the armature, and an insulating-washer $h^5$ at the other end, as usual. The commutator is mounted on shaft H' alongside the armature, with the said intervening-insulation $h^4$, as usual, and is preferably constructed, as I shall now describe.

Figure 25:
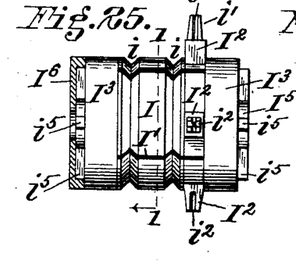
Fig. 25 a longitudinal elevation of my preferred form of commutator, the insulating-washer at the left-end being shown in section.
Figure 27:
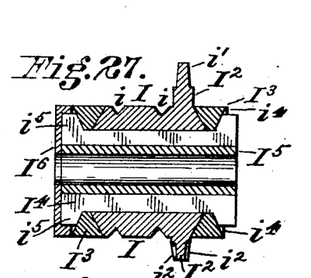
Fig. 27 a central, longitudinal section of the commutator shown in Figs. 25 and 26.
Figure 28:
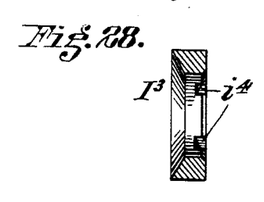
Fig. 28 a central, sectional elevation of one of the commutator end-rings.
Figure 29:
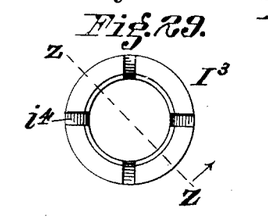
Fig. 29 a front elevation of said commutator end-ring complete.
Figure 30:
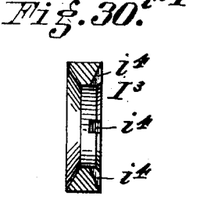
Fig. 30 a sectional elevation of said commutator-ring on line z, z, of Fig. 29 in the direction of the arrow.

I represents each one of the segments having the customary intermediate insulations I', and both provided with a pair of V-shaped circumferential grooves $i, i$, as are most clearly shown in Figs. 25 and 27.

$I^2$ represents each one of a number of lugs or shanks projecting radially from one end of the several segments, at regular intervals apart and preferably terminating in a tapered extension or nipple $i'$, the latter having one or more grooves $i^2$, all as clearly shown in Figs. 16, 25, 26 and 27. These nipples are provided for the wire attached thereto, of the opposite ends of the respective coils of the armature, said ends of the coils resting or seating in said grooves $i^2$, and fine binding-wire $i^3$, wrapped around the seated coil-ends and the nipples, and then solder used thereon for making good contact, as best shown in Fig. 5.

Figure 26:
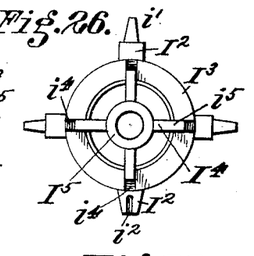
Fig. 26 an end elevation of Fig. 25, one of the segment-shanks for the armature-wire connection being shown without an extension or nipple, and having additional wire-grooves.

It is obvious that the segment lugs or shanks could be used, if desired, without the nipples, and formed with grooves, as shown in the lowermost lugs in Figs. 25, 26 and 27, the ends of the armature-coils being attached thereto in the same manner as above described.

The opposite ends of the segments and their separating insulations are beveled or inclined to accommodate correspondingly-beveled rings $I^3$, the latter having inclined grooves or notches $i^4$ in their outer sides for accommodating the inclined lugs or projections $i^5$ at the opposite ends of the bars or ribs $I^4$, which pass longitudinally through the commutator from end to end, and rest along their inner edges on the outer face of central hub $I^5$. The hub $I^5$ is practically a longitudinal sleeve or cylinder composed of any suitable material, of about the same length as said bars or ribs $I^4$, and firmly secured on the armature-shaft for rotation therewith. The said inner edges of the bars $I^4$ may be concaved to suit the outer contour of the hub $I^5$, and thereby make the parts fit more readily and snugly. Said parts of the commutator are put together as follows: The segments and insulations are placed between the rings; then the ribs or bars are introduced with their inclined lugs seated in the inclined notches or grooves in the outer sides of said rings; then the central hub or sleeve is driven into place between said ribs, forcing or expanding the latter out radially and forming a wedge-commutator, all the parts of which are thus firmly and compactly held or tightly gripped together. The outer face or perimeter is then turned to size, to suit the style and capacity of machine, and to obtain a perfectly cylindrical and smooth surface.

The V-shape grooves may be made in the face thereof or not, as desired, but I have shown them herein, to suit the form of brushes or collectors I prefer to use in my present construction, and which I shall describe hereinafter.

An insulating head or washer $I^6$ is applied to the outer end of the commutator, as clearly shown in Figs. 5, 16, 25 and 27.

The bearings or supports for the armature-shaft and brush-holder I shall now describe. The bearing for the end of the shaft which receives and supports the pulley J, is composed of a horizontal, bow-shape or outwardlycurved yoke or frame J', having an enlarged or broadened central-portion which is constructed with a hollow, spherical chamber or socket J². This yoke is preferably made in two sections, or split vertically along its longitudinal center, with an inner division $j$ and an outer one $j'$, the said division $j$ having an inwardly-disposed central hub or annular-flange $j^2$. A central side-opening is made in both divisions $j$ and $j'$ of the yoke for the outward passage of the armature-shaft, and a central, top-opening $j^3$ is also provided, all as clearly shown in Figs. 3 and 5.

J³ is a spherical filling or ball, centrally-orificed to fit over the armature-shaft, within the said chamber or socket J², and $j^4$ is an annular extension or neck, projecting inwardly from the ball J³, and fitting within the said hub $j^2$ of the yoke-division $j$, as best seen in Figs. 5 and 10. The split-yoke enables the ready insertion of said ball J³ within its central-socket, and the neck on the ball is provided to give a longer or more extended bearing-surface for the shaft.

The object of constructing the yoke in two parts is to attain the many advantages hereinbefore described in connection with the pole-pieces and field-magnets, viz: to construct most of the openings and sockets without drilling or coring, the central socket comprising a hemi-spherical recess in each division, $j$ and $j'$, and the top opening comprising a semi-circular notch or opening in both said divisions; also to reduce the cost of repairs to a minimum, as either division, $j$ or $j'$, could be replaced much cheaper than if the whole yoke were made in one piece and also more easily handled, and the ball J³, taking all the wear, (occasioned by the high-speeded shaft,) off the yoke, said ball could obviously be more readily and cheaply replaced than an entirely new yoke.

J⁴ is an oil-cup of any suitable design or construction, whose lower threaded stem or nipple $j^5$ is inserted through the said top opening $j^3$ into a central, threaded orifice or hole $j^6$ made in the top of ball J³, the central, vertical passage-way in said stem of the oil-cup leading to the shaft for properly distributing the lubricant thereon. Said stem holds the ball at rest and prevents its turning in the yoke-socket. The opposite ends of the split-yoke are perforated to receive screws $j^7$, whole shanks enter the central-openings of the ears or bosses G on the pole-pieces, and engage the nuts $g^2$ seated in the bottom of the pole-chambers G', as hereinbefore described, and shown in Figs. 2 and 4. The extreme ends of the yoke abut against the lateral projections or flanges $g$ at the rear ends of said ears G, and thereby stops are provided whereby the pole-pieces and field are properly spaced from each other, with the armature in its true, central relation or position between them. These stops always enable the ready and accurate setting of the parts in place at the top of the machine, the projections or steps $d^3$ on the magnet-shells D, D', insuring a similar advantage at the bottom of the machine. The nuts $g^2$, being seated in the pole-chambers in practically a permanent manner, and said chamber-walls being angular to prevent said nuts turning therein, means are thereby always at hand to receive the fastening-screws or bolts, and all drilling, boring, or tapping of the pole-pieces, or passing bolts clear across them, for fastening the bearings in place, are entirely and very advantageously obviated.

The other or commutator end of the armature-shaft has an open, rectangular, bearing frame or yoke, which is composed of a longitudinal portion K and two transverse or inwardly disposed portions or arms K', K², the latter having lateral ears $k$ which are perforated to receive fastening-screws $k'$. The shanks of screws $k'$ are inserted in orificed-ears G on the pole-pieces, and engage the internal nuts $g^2$ of the pole-chambers G', to secure this bearing-frame to the pole-pieces, and the lateral projections $g$ form stops on said ears G, for the same purpose and in like manner, as those hereinbefore described in connection with the bow-shape bearing-yoke at the other end of the shaft. The longitudinal portion K, aforesaid, is preferably constructed in two parts or divisions, being split along the center horizontally, (the reverse of the said bow-shape yoke or bearing-frame, which is split vertically,) as is most clearly shown in Figs. 1, 11 and 16. The lower division thereof is constructed integral with the said inwardly disposed arms K' and K², and has a central hemi-spherical recess or socket with semi-circular side-openings or notches for the reception and outward-passage of the shaft. L is a circular hub or flange projecting from the side of the central portion of the said lower division of the bearing, concentric with and contiguous to said hemi-spherical recess, and also centrally orificed for the reception of the shaft. The peripheral face of this hub is constructed with inclined or beveled groove $l$ to provide a suitable circular-seat or swivel-bearing for the rocking bar or yoke of the brush-holder device. The upper division of said longitudinal bearing-portion K, forms practically the cap or cover thereof. It fits within the shoulders or stops $k^3$ formed on the upper face of said lower division of the bearing, and is constructed the same in outline, with a corresponding central hemi-spherical recess or socket, and semi-circular side-openings or notches, the said sockets and notches of the lower division coinciding with those of the upper division or cap-plate, and together forming the circular-holes for said shaft. L' is a centrally orificed spherical filling or ball fitting over the shaft within the spherical-chamber formed by said hemi-spherical recesses in bearing K, and having an annular extension or neck $l'$, projecting inwardly therefrom through the orifice at the inner side of said bearing K into the central-orifice of the said rocking-bar bearing-hub L, as clearly shown in Fig. 5. After the ball L' has been properly seated in the lower recess or chamber, the upper cap-plate is then readily set in place thereon, the stops $k^3$ insuring the positive coincidence or registering of the two hemi-spherical recesses aforesaid, and properly fastened by screws $l^2$. An oil-cup $L^2$, with a pendent screw-threaded stem or nipple, is attached to bearing K similar to the oil-cup at the other end of the shaft, as above described, the said nipple entering a central opening in the top of both the cap-plate and ball, with its lower end free to lead and distribute the lubricant. The ball, its annular-extension and accessories, at this end of the shaft, as just described, form the same relation thereto and the bearing-frame or yoke, as those at the other end, and the same advantages and uses being attained thereby, it will be unnecessary to repeat them now.

M represents a rocking bar or yoke, having a central, inclined orifice $m$, by which it is swiveled on the said bearing-hub L, as clearly shown in Figs. 5, 16 and 17. This rocking-bar is provided for the usual purpose of carrying the brush-holders, my preferred form of brush-holder being shown complete in Figs. 1, 3, 4, 5 and 16, and which I shall first describe.

M' and $M^2$ represent parallel cylindrical-boxes constructed at the opposite ends of the rocking-bar M, and provided with side openings or orifices $m'$ for the reception of about half the length of fiber-spindles N, which latter form the brush-holders proper.

$m^2$ represents a spiral-spring surrounding the fiber-spindles or arms N, within the opposite ends of both boxes or chambers M' and $M^2$, one end $m^3$ of each spring being caught or engaging an open transverse slot or cut $m^4$ made in the outer ends of both said spindles, and the other ends $m^5$ of said springs being turned outward and resting in the slots or holes $m^6$ made in the inner end or head of said boxes or chambers M' and $M^2$, as best shown in Fig. 16. The rocking-bar and said brush-holder boxes are preferably cast split down the center longitudinally, thus forming two corresponding halves or parts, a semicircular socket being cast integral at each end of each half, which, when both halves are brought together, coincide and constitute the said cylindrical boxes M' and $M^2$. The said inclined, central opening or orifice $m$ is thus composed of two semicircular openings or concavities, and lugs or offsets $n$, $n$, and $n'$, $n'$, are cast in pairs on both said halves, the pair of lugs $n$ having smooth holes or orifices $n^2$ and the pair $n'$ having threaded orifices or holes $n^3$ (as shown in the modification, Fig. 18), and the said pair $n$ coinciding with those $n'$ when said halves of the rocking-bar are brought together, screws $n^4$ being used to securely fasten both halves or divisions together. Semicircular openings or concavities are made in corresponding pairs, in both said halves, which afterward constitute or compound holes O, O, in the rocking-bar when both its divisions are brought together, to furnish said holes without drilling and to permit the passage or insertion of connecting-wires, more conveniently and expeditiously.

The manner of splitting or separating both boxes M' and $M^2$ in two sections facilitates the insertion of the ends of the holder spindles N, and the proper adjustment of the spiral-springs therein, as is clearly obvious.

$o$ represents a pin projecting from each spindle N within the boxes M' and $M^2$, adjacent the inner shouldered end or head of each of said boxes, to prevent the lateral play in one direction, or displacement of said spindles in or from said boxes, the spiral-springs allowing a lateral movement in one direction outwardly, but no displacement of said spindles, when both halves of the rock-bar and boxes are securely fastened or bound together.

P, P, represent the upper, and P', P', the lower pair of brushes, mounted or seated in transverse, open slots or recesses $p\,p$ in said spindles, as best shown in Figs. 16 and 19; and $p'$ is a cylinder or sleeve, surrounding said spindles and covering said open slots $p$ and that portion of each brush contained or seated therein, notches or open slots $p^2$, $p^2$, being provided in each end of said sleeves for the reception and outward-passage of said brushes, as fully shown in Figs. 3, 4, 5, 16, 19, and 21.

$p^3$, $p^3$, are combined binding and set screws inserted through the sleeves $p'$, with their inner ends bearing firmly upon the brushes, to properly hold the latter adjustably in place in said sockets or slots $p^2$, as best shown in Fig. 19, and also for receiving the ends of connecting-wires.

Q represents a connecting-wire running through a hole $q$ in both holder spindles or arms N, a portion of said holes $q$ being exposed to the brushes for proper contact, and one end $q'$ leading outward to the circuit-wires. The other end of each wire Q may be bent as shown at $q^2$, and turned up against the binding-screws $p^3$, thus providing a double-contact for said wires $q$ in connection with the brushes.

In Figs. 22, 23 and 24, I show several modified forms of sleeves $p'$, for use on the brush-holders, Figs. 22 and 23 covering one and the same form, in which the slots $p^2$ are closed ones, and the form shown in Fig. 23 being split in the middle transversely and provided with one long slot $p^2$ for receiving the brushes.

The inner or contact ends of the brushes are made to conform to the style of commutator, those shown being V-shape to conform to the V-shape grooves in my commutator. It is obvious, other forms of brushes without grooves in the commutator can be used, as customary, without departing from my invention herein, but I prefer the grooves for the reason that I get a larger contact without a great spread of brush, noise, and sparking.

The spirals in the holder-boxes cause the contact-ends of the brushes to bear laterally in the grooves of the commutator, and exert the proper tension or pressure thereon. In order to take up any weakness in the spirals, caused by constant use or otherwise, the set-screws $p^3$ are loosened and the brushes drawn outward about half way, thus permitting their ends to clear the commutator, and then the spindles may be revolved so as to wind up and strengthen or tighten said springs thereon.

In the modified form of brush-holder, the boxes M' and M², at both ends of the rocking-bar, are constructed so that their chambers or openings are in line with each other, or at right angles to the shaft, (the other or preferred form being parallel with said shaft,) and spirals $m^2$ are seated in the extreme ends or bottoms of said chambers, with their ends $m^5$ seated in slots or holes $m^6$, as best seen in Fig. 17.

The fiber arms or brush-holders proper N are shown as angular or square at their upper ends, which latter rest in similar, angular-shape sockets or walls in the boxes M' and M², and engage the outer ends of said springs $m^2$. The lower or inner ends of these arms N are bifurcated or split as shown at R, (Fig. 17,) to receive the outer ends of the carbon-brushes P (one only being shown in said Fig. 17), and rings or bands R' are used over the said split-ends, together with set-screws $r$, whereby said carbon-brushes are firmly and adjustably secured in place. The spirals in this modification exert a direct pressure of the brushes on the commutator, and the rocking-bar and boxes are made separable in two halves or divisions and fastened together, the same as those described in the preferred form.

The usual terminals and connecting wires S, $s$, and $s'$, are applied to the field and brushes as customary, and will need no detailed description herein.

It will be observed that the many advantages in the way of casting or constructing and assembling the parts above described, tend to cheapen the cost of manufacture and render my dynamo more easily repaired and any of the parts replaced than any hitherto made or in use. It will also be observed that said construction necessitates the employment of very little machinery in making and fitting the parts, which is a decided advantage.

I claim—

1. In a dynamo-electric machine, a supporting-base composed of an open, oblong frame having upper and lower guideways along its inner longitudinal sides, a bottom or base proper for the dynamo, having an upper-plate and a lower-plate whose opposite side edges engage or slide upon said guideways, a central upright projection or standard at the fore-edge of said bottom-plate, a central recess or formation at the fore-edge of said upper-plate adapted to receive said standard, semicircular, tapered grooves or notches constructed in both said standard and its recess and registering to form a tapered or conical hole or socket when said plates are brought together, a central standard at the fore-end of said open base-frame having an upwardly open slot with grooved sides to accommodate a filling or nut, a handled-screw which engages a threaded-orifice in said nut and has a smooth inwardly tapering or conical formation at its fore-end which corresponds to and engages the said tapered hole or socket at the fore-end of said base-proper, the whole being constructed, arranged and adapted to operate, substantially as and for the purpose specified.

2. In a dynamo-electric machine, field-magnets and pole-pieces constructed in two divisions or longitudinally split down their centers both divisions of both said magnets and poles being made hollow or chambered to accommodate fillings or cores of magnetic-permeability, and said magnets having the usual wire coils wound thereon.

3. In a dynamo-electric machine, having a magnetic-field within which are located a magnet or magnets and pole-pieces, constructed with chambers or cavities which contain suitable fillings or cores of magnetic-permeability, each of said magnets being composed of a hollow-shell with the usual surrounding-coil and surmounted by a polar-extension, and both shell and polar-extension split or divided into sections and having semi-circular notches in the inner faces or contiguous edges which register to form or compound circular holes or passage-ways when said sections are fitted together, semi-circular extensions or flanges forming split-bosses on said sections, caps fitting over said bosses, and bolts for securing the parts together and upon a suitable base, substantially as herein set forth.

4. In a dynamo-electric machine, having a magnetic field within which are located a pair of upright hollow-shells surmounted by hollow polar-extensions or pole-pieces, the latter being suitably concaved on their inner faces to accommodate the armature, suitable coils wound around said shells, fillings or cores within said hollow-shells and pole-pieces, nuts in the bottoms of the chambers or cavities formed in said pole-pieces, ears or bosses on the pole-cheeks having central orifices or holes leading to the threaded openings of said nuts, centrally-orificed bosses projecting upwardly from the pole-pieces and centrally-orificed caps fitting over said top-bosses, the said shells and pole-pieces being constructed in two divisions each with semicircular coinciding or registering holes and grooves, and the lower ends of said shells having pendent projections or steps which engage slots or openings in the base, and both magnets of the field being bolted to said base, all substantially as herein set forth.

5. A magnet whose pole-piece is made hollow and has lateral ears or bosses on its side-cheeks, the inner cavity of said pole-piece having angular-bottoms, and said ears or bosses having central openings leading to said cavity, a filling or core in the cavity of magnetic permeability, and nuts in the angular bottoms of the cavity registering with the central opening, whereby the shanks of fastening-screws for the bearings are readily applied, substantially in the manner and for the purpose herein set forth.

6. In a magnetic-field, a magnet whose pole-piece is made hollow and in two divisions, each a counterpart of the other, both divisions having a cavity for receiving a core or filling of magnetic-permeability, the bottom or innermost end of each cavity having a nut and partition or stopper placed therein beneath said filling or core, and centrally-orificed ears or bosses provided with stops or flanges $g$, on the side-cheeks, substantially as herein set forth.

7. In a dynamo-electric machine, an armature composed of a drum or cylindrical-shell, having one end closed and the other end open, the latter being provided with a suitable cap or removable head, a core or filling of magnetic-permeability within said shell, central bosses on the outer faces of both said permanent and removable heads, suitable set-screws or other fastenings in said bosses to secure the armature on the shaft, and the outer face suitably wrapped with the usual coils or conductors, substantially as herein set forth.

8. In a dynamo-electric machine, a commutator composed of segments having sloping or beveled ends properly grouped and insulated, as customary, clamping-rings having beveled inner faces which engage with both beveled ends of the segments, taking in all the segments collectively, radial inclined grooves or notches in the outer faces of said clamping-rings, longitudinal bars or ribs having lugs or projections at their opposite ends with inner bevels or inclines which engage or seat in said radial inclined grooves or notches in the clamping-rings, and a central hub or barrel, which, when driven into place within said ribs forces or expands the latter outwardly or radially, thereby causing the clamping-rings to firmly engage the outer, beveled ends of said segments and wedge or lock them rigidly in place, and the whole rigidly mounted on the armature-shaft, which passes through the said barrel or hub, substantially as herein set forth.

9. In a commutator, a segment provided with one or more radial shanks or projections each having one or more grooves or sockets upon its exterior and extending from the tip of the nipple toward the armature shaft, whereby the ends of the wire-coils on the armature are securely attached and bound in place, for connection with the commutator, substantially as herein set forth.

10. In a dynamo-electric machine, the combination with the armature-shaft, of bearing frames or yokes, the bearing-frame at one end being formed in two parts vertically and provided with a central-socket containing a centrally-orificed ball or sphere, an oil-cup whose feeding-stem or nipple passes downward through an upper orifice in said bearing-frame and is seated in a threaded orifice in the upper part of said ball and leads to the armature-shaft for the lubrication thereof, and the bearing-frame at the opposite end said shaft being also formed in two parts longitudinally, one part having inwardly disposed arms which support it so as to accommodate the commutator, and provided with a central socket containing a centrally-orificed ball or sphere, an oil-cup whose shank passes through an upper opening in the cap of said bearing and seats in a threaded-opening in said ball which leads to the shaft for distributing the lubricant, both bearing-frames being suitably secured in place so as to support said shaft in proper relation to the magnetic-field, substantially as herein set forth.

11. In a dynamo electric machine, the combination with the bearing frame for the armature composed of two parts, each of which is provided with a central socket, a ball or sphere within the sockets of the frame and provided with a lateral extension or neck, said sphere and neck being provided with an opening or hole, and a shaft through the opening in the sphere and neck, substantially as set forth.

12. In a dynamo-electric machine, an open, horizontally-split bearing-frame composed of a lower division or bearing-proper and an upper division or cap therefor, a central, circular hub or flange L constructed on the inner side of said lower division and provided with an inclined peripheral groove $l$ for the reception of the swivel-portion of the rocking-bar of the brush-holder device, substantially as herein set forth.

13. In a dynamo-electric machine, a brush holding or supporting device composed of a rocking-bar, hollow heads or boxes at both ends said bar, spindles or barrels forming the brush-holders proper and supported at one end in said boxes, spiral-springs in said boxes engaging said spindles to exert the proper tension thereon, slotted-sleeves on said spindles, and brushes seated in slots or notches in said spindles and passing through the slots in said sleeves with their inner ends bearing on the commutator, suitable binding-screws for adjustably setting said brushes in position and attaching the connecting-wires, and a connecting-wire Q passing through said spindles, the whole being suitably mounted on the armature-shaft free from revolving therewith, substantially as herein set forth.

14. In a dynamo-electric machine, a brush-holding device, whose rocking-bar and spindle or brush-holder heads are constructed in two divisions or split in halves centrally and longitudinally, in combination with a bearing-hub L, the latter having an inclined or beveled groove $l$, and said split rocking-bar having a central inclined-orifice $m$ engaging and swiveling on said bearing L, and the halved rocking-bar provided with lugs and fastening or uniting devices, substantially as herein set forth.

WILLIAM S. F. DILLON.

Witnesses:
EDWARD B. KOTTEK,
RICHARD HUGGARD.